United States Patent [19]
Perkins

[11] 3,794,060
[45] Feb. 26, 1974

[54] PNEUMATIC CONTROL SYSTEM AND METHOD OF OPERATING THE SAME OR THE LIKE
[75] Inventor: Charles H. Perkins, Richmond, Va.
[73] Assignee: Robertshaw Controls Company, Richmond, Va.
[22] Filed: June 21, 1972
[21] Appl. No.: 265,111

Related U.S. Application Data
[62] Division of Ser. No. 81,828, Oct. 19, 1970, Pat. No. 5,683,949.

[52] U.S. Cl. .................. 137/14, 137/84, 251/120
[51] Int. Cl. ......................................... G05d 16/00
[58] Field of Search ......... 137/14, 82, 84; 251/120

[56] References Cited
UNITED STATES PATENTS
3,621,862  11/1971  Wojtecki ........................... 137/82

Primary Examiner—Alan Cohan
Assistant Examiner—Gerald A. Michalsky
Attorney, Agent, or Firm—Candor, Candor & Tassone

[57] ABSTRACT

Passage defining means interconnecting a source of pneumatic fluid to a pneumatically operated control device. Flow control variable restrictor means is disposed in the passage defining means intermediate the source and the control device whereby the passage defining means has a part thereof disposed between the restrictor means and the control device. A variable vent means is interconnected to the part of the passage defining means and is responsive to pressure in that part of the passage defining means. The flow control variable restriction means tends to maintain a substantially constant pneumatic flow in the part of the passage defining means even though the pressure in the part of the passage defining means varies and/or the pressure of the pneumatic source varies.

9 Claims, 5 Drawing Figures

PATENTED FEB 26 1974
3,794,060
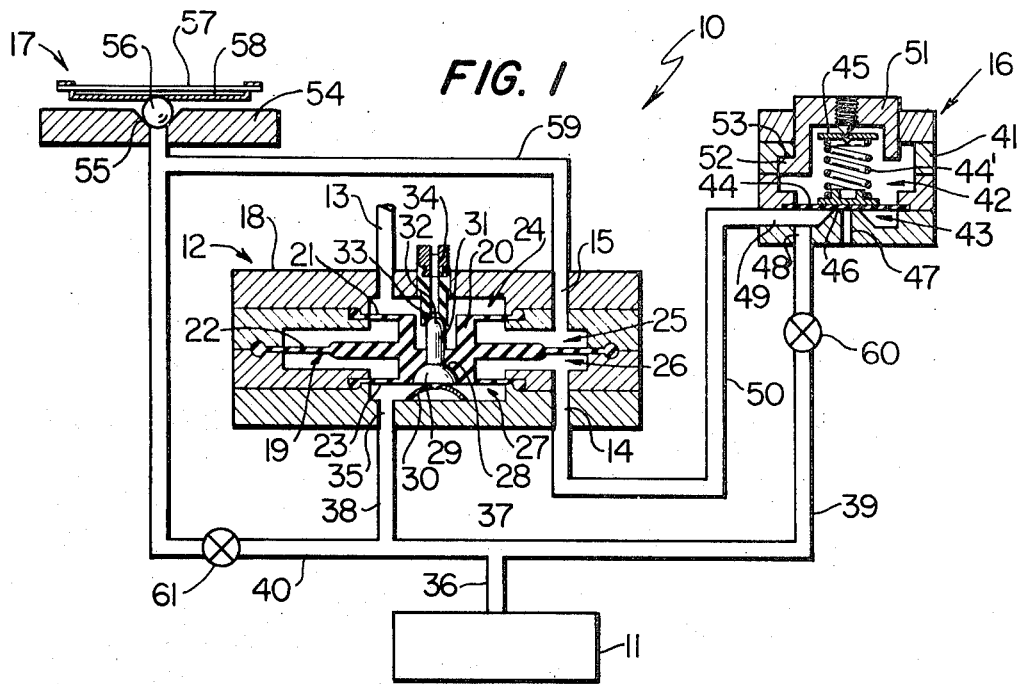
FIG. 1
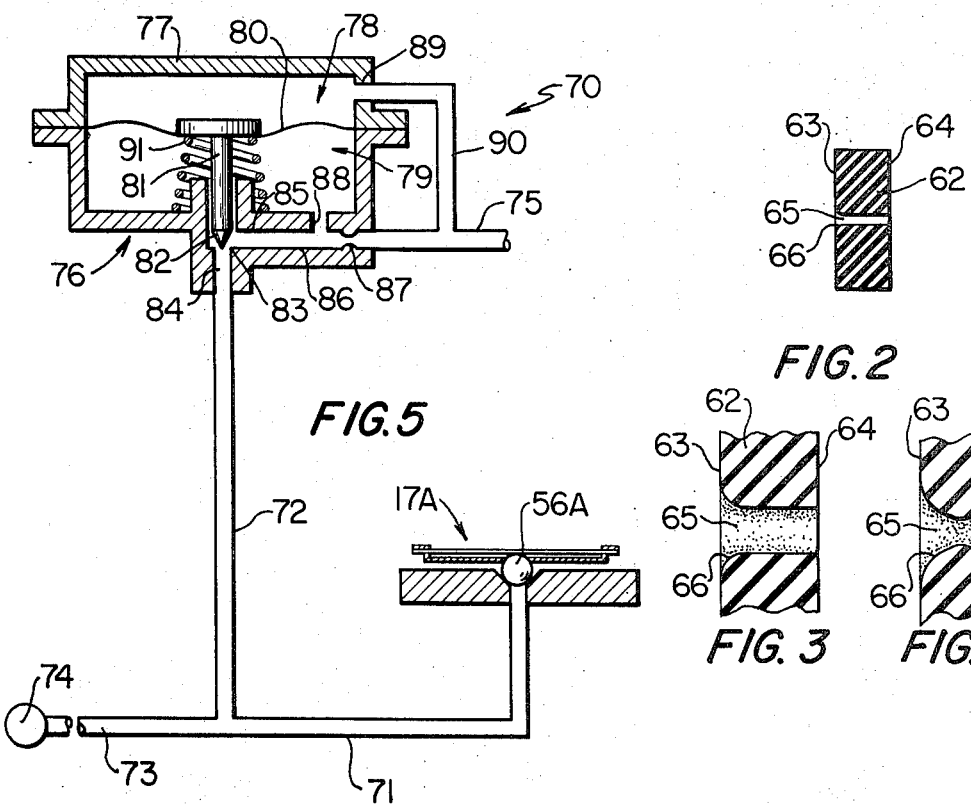
FIG. 5
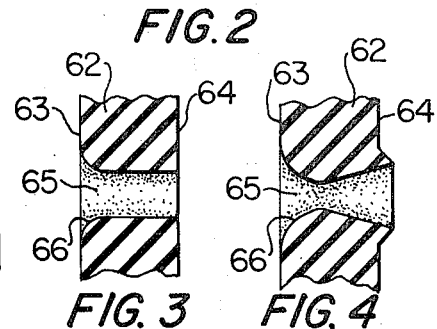
FIG. 2
FIG. 3   FIG. 4

PNEUMATIC CONTROL SYSTEM AND METHOD OF OPERATING THE SAME OR THE LIKE

This is a division, of application Ser. No. 081,828, filed Oct. 19, 1970, now U.S. Pat. No. 5,683,949.

This invention relates to a pneumatic control system and to a method of operating the same, as well as to improved parts of such a pneumatic control system or the like.

It is well known that pneumatic control systems have been provided wherein a control device is fed pneumatic fluid from a pneumatic source under the control of one or more control devices that vary the pressure of the resulting pneumatic signal being directed to the control device.

For example, one such control device that varies the pressure of the pneumatic signal being directed to the other control device comprises a vent means which vents the pneumatic signal in varying degrees to the atmosphere or the like in response to various conditions.

It has been found according to the teachings of this invention, that the air consumption of such prior known control systems can be improved if a means is provided for maintaining a constant fluid flow to the pneumatic control or in the system even though the supply pressure and/or signal pressure may vary.

Accordingly, it is a feature of this invention to provide such a means for maintaining a constant flow rate to the control device even though the pressure signal thereto may vary and/or the supply pressure signal may vary.

In particular, one embodiment of this invention comprises a source of pneumatic fluid interconnected to a control device by a passage defining means. A flow control variable restrictor means is disposed in the passage defining means intermediate the source and the control device so that the passage defining means has a part thereof between the restrictor means and the control device. A variable vent means is interconnected to the part of the passage defining means and is responsive to pressure in the part of the passage defining means. The variable restrictor means tends to maintain a substantially constant pneumatic flow in the part of the passage defining means even though the pressure in the part of the passage defining means varies and/or the pressure of the pneumatic source varies because the variable restrictor means comprises a resilient washer-like member wherein the opening therethrough reduces in size upon an increase in the pressure differential across the same and increases in size upon a decrease in the pressure differential across the same.

Accordingly, it is an object of this invention to provide an improved pneumatic control system, the control system of this invention having one or more of the novel features set forth above or hereinafter shown or described.

Another object of this invention is to provide improved parts for such a pneumatic control system or the like.

Another object of this invention is to provide an improved method of operating such a pneumatic control system or the like, the method of this invention having one or more of the novel features set forth above or hereinafter shown or described.

Other objects, uses, and advantages of this invention are apparent from a reading of this description which proceeds with reference to the accompanying drawings forming a part thereof and wherein:

FIG. 1 is a schematic view, partially in cross-section, illustrating one pneumatic control system of this invention.

FIG. 2 is a cross-sectional view illustrating the flow control variable restrictor means utilized in the system of FIG. 1.

FIG. 3 is an enlarged fragmentary cross-sectional view of the flow control of FIG. 2 illustrating the opening therethrough when a narrow pressure differential exists across the same.

FIG. 4 is a view similar to FIG. 3 and illustrates the flow control device when a large pressure differential exists across the same.

FIG. 5 is a view similar to FIG. 1 and illustrates another pneumatic control system of this invention.

While the various features of this invention are hereinafter described and illustrated as being particularly adapted for a pressure pneumatic control system, it is to be understood that the various features of this invention can be utilized singly and in any combination thereof with other types of fluid control system, such as vacuum control systems and the like, as desired.

Therefore, this invention is not to be limited to only the embodiments illustrated in the drawings, because the drawings are merely utilized to illustrate some of the wide variety of uses of this invention.

Referring now to FIG. 1, one of the improved pneumatic control systems of this invention is generally indicated by the reference numeral 10 and comprises a pneumatic pressure source 11 and a pneumatically operated control device or comparator 12 for directing a control pressure out of an outlet conduit means 13 thereof in relation to the differential in a pair of pneumatic pressure signals directed respectively into signal inlets 14 and 15 thereof by a set point adjuster 16 of the control system 10 and a condition response means 17 of the control system 10.

The control device 12 is a comparator relay and is defined by a housing means 18 carrying a one-piece diaphragm member 19 comprising a central post means 20 and a plurality of outwardly directed and axially spaced diaphragm portions 21, 22 and 23 suitably secured in the housing means 18 to define four chambers 24, 25, 26 and 27 in stacked relation with the outboard chambers 24 and 27 being adapted to be interconnected to each other through an opening means 28 passing through the diaphragm post means 20 but being controlled by a movable valve member 29 normally urged in a valve seating position or direction by a bowed lead spring 30.

The valve member 29 of the comparator 12 has a stem 31 projecting therefrom out through the bore 28 in the post means 20 of the diaphragm member 19 to define another valve member 32 at the end thereof which is adapted to seat against a valve seat 33 projecting into the outboard chamber 24 and having a bore 34 passing therethrough for interconnecting the valve seat 33 to the atmosphere when the valve member 31 is in an open position relative to the valve seat 33 for a purpose hereinafter described.

The intermediate chambers 25 and 26 of the comparator 12 are completely separate from each other and from the other chambers of the relay 12 while being respectively interconnected to the pneumatic signal inlets 15 and 14 whereby when the pneumatic pressure signals in the chambers 25 and 26 are in balance, the spring 30 maintains the valve member 29 in its seating position against the valve seat 28 and maintains the diaphragm member 19 in an upward position so that the other valve part 32 seats against the valve seat 33 to prevent fluid communication between the atmosphere and the chamber 24. However, when the pressure differential across the intermediate diaphragm portion 22 increases such as by having the chamber 25 receiving a greater pressure than the chamber 26, the diaphragm member 19 is moved downwardly whereby th valve member 29 moves in unison therewith in opposition to the force of the spring 30 while maintaining the valve seat 28 in a closed position so that fluid communication between the chambers 24 and 27 is still prevented. However, the valve part or stem 31 is moved away from the valve seat 33 so that the pressure in the chamber 24 is adapted to be vented to the atmosphere whereby the pressure of the signal in the outlet conduit 13 correspondingly decreases.

Conversely, when the pressure in the chamber 26 exceeds the pressure in the chamber 25 by a certain amount, the diaphragm member 19 is moved upwardly in FIG. 1 whereby the valve part 31 remains in or moves into sealing engagement with the valve seat 33 to terminate venting of the chamber 24 to the atmosphere. Thus, the valve member 29 now remains stationary and the diaphragm member 19 moves upwardly to open the valve seat 28 away from the valve member 29 and thereby interconnect the chamber 27 with the chamber 24. Since the chamber 27 is adapted to be interconnected by an inlet means 35 to the pressure source 11, pressure now enters from the chamber 27 into the chamber 24 to increase the pressure of the outlet pressure signal in the outlet conduit 13 by an amount corresponding to the movement of the diaphragm member 19 away from the stationary valve member 29.

Therefore, it can be seen that the comparator 12 changes the pressure of the output signal in the outlet conduit 13 thereof corresponding to the changes in the pressure differential acting across the intermediate diaphragm portion 22 thereof as controlled by the pneumatic pressure signals being fed thereto at the signal inlets 14 and 15 for the reasons previously set forth.

The pneumatic source 11 is adapted to be interconnected to the inlet 35 of the comparator 12 by interconnecting conduit means 36, 37 and 38 with the conduits 36 and 38 respectively being interconnected to the pressure source 11 and comparator 12 while the conduit means 37 is disposed intermediate the conduits 36 and 38, the intermediate conduit 37 respectively having branch legs 39 and 40 leading respectively to the set point adjustor 16 and condition responsive means 17.

The condition responsive means 16 comprises a pressure regulator defined by a housing means 41 divided into two chambers 42 and 43 by a flexible diaphragm 44 urged downwardly in FIG. 1 by a compression spring 44' disposed intermediate the diaphragm 44 and an adjustable plate 45 whereby the force of the compression spring 44' tends to maintain the diaphragm 44 against a valve seat 46 projecting into the chamber 43 and being interconnected to the atmosphere by a bore means 47. The supply pressure conduit 39 is interconnected to an inlet 48 in the housing means 41 which in turn is interconnected to the chamber 43, the chamber 43 also being interconnected at an outlet 49 thereof to a conduit means 50 that leads to the signal inlet 14 of the comparator 12.

The force of the compression spring 44' that tends to maintain the diaphragm valve member 44 against the valve seat 46 is manually adjustable by a knob construction 51 that has a tang 52 thereof acting on a cam surface 53 of the housing 41 so that the force of the compression spring 44' can be manually adjusted by the operator or the like rotating the knob 51 and thus adjusting the up and down movement of the spring plate 45.

In this manner, the set point adjustor 16 tends to maintain a constant signal pressure in the conduit 50 and, thus, in the chamber 26 of the comparator 12 in relation to the setting of the control knob 51 thereof.

In particular, should the pressure in the chamber 43 exceed the pressure setting of the control knob 51, the pressure differential acting across the diaphragm 44 overcomes the force of the compression spring 44' and moves the diaphragm 44 away from the valve seat 46 so that the pressure in the chamber 43 is vented to the atmosphere through the opened valve seat 46 whereby the pressure in the conduit 50, and thus, the chamber 26 of the comparator 12 reduces to the control pressure of the setting of the knob 51 of the device 16. Conversely, when the pressure in the chamber 26 falls below the selected pressure of the control knob 51, the compression spring 44' moves the diaphragm 44 toward the valve seat 46 so as to decrease the venting of the chamber 43 to the atmosphere so that the pressure from the pressure source 11 builds up the pressure in the chamber 43 and, thus, in the chamber 26 of the comparator 12 to the set pressure of the control knob 51.

In that manner, the valve member 44 moves back and forth relative to the valve seat 46 to maintain a constant pressure in the chamber 26 corresponding to the pressure setting of the knob 51 whereby the vent means provided by the valve seat 46 is variably adjusted by the spring means 44' and the pressure differential across the diaphragm 44.

The condition responsive means 17 is also a variable vent means but is under the control of sensed temperature.

In particular, the condition responsive means 17 comprises a valve seat member 54 having a valve seat 55 interconnected to the branch pressure conduit 40 whereby when the valve seat 55 is open, the branch pressure conduit 40 is interconnected to the atmosphere. However, a ball valve member 56 is normally urged toward the valve seat 55 by a bimetal leaf spring means 57 carried by a stationary frame structure 58 so that at one sensed temperature of the bimetal member 57, the ball valve member 56 is urged to its closed position against the valve seat 55 by one spring force and at another sensed temperature, the ball valve member 56 will be urged toward the valve seat 55 with a different spring force.

For example, should the control system 10 control a heat exchanger wherein the heat exchanger decreases its temperature output upon an increase in the control pressure being directed thereto by the conduit 13, an increase in the sensed temperature of the device 17 from a fixed temperature setting thereof will cause the bimetal member 57 to urge the ball valve member toward the valve seat 55 with a lesser force than at a lower sensed temperature whereby the comparator 12 will increase the pressure output in the outlet 13 to decrease the output effect of the heat exchanger. In this manner, the heat exchanger will tend to maintain the temperature output at the temperature output setting of the set point adjustor 16.

In particular, the branch conduit 40 is interconnected to the signal inlet 15 of the comparator 12 by a conduit means 59 whereby the signal in the chamber 25 of the comparator 12 has its pressure reduced when the force of the bimetal spring means 57 reduces so that the pressure differential across the diaphragm portion 22 of the diaphragm member 19 causes the diaphragm member 19 to move upwardly and thereby increase the pressure in the chamber 24 and, thus, in the outlet conduit 13. Conversely, a decrease in sensed temperature causes the valve member 56 to be urged toward the valve seat 55 by the bimetal spring means 57 with a greater force so that the pressure in the chamber 25 correspondingly increases and when the sensed temperature drops below the temperature setting of the device 16 a certain amount, the diaphragm member 19 is moved downwardly to decrease the pressure in the chamber 24 and, thus, in the outlet conduit 13 whereby the heat exchanger increases its temperature output.

Therefore, it can be seen that the control system 10 is adapted to control a heat exchanger to a desired temperature output thereof as set by the set point adjustor 16 and being sensed by the temperature sensor 17.

It has been found according to the teachings of this invention that the air consumption of the control system 10 of FIG. 1 can be greatly improved if the flow rate of the pneumatic signals being continuously directed to the chambers 25 and 26 of the comparator 12 by the devices 17 and 16 is at a constant rate and not at a variable rate even though the pressure in the chambers 25 and 26 varies or the supply pressure from the source 11 varies.

Accordingly, a pair of like flow control variable restrictor means 60 and 61 are respectively disposed in the branch conduit means 40 and 39 intermediate the source 11 and the control device 12 whereby the set point adjustor 16 is disposed intermediate the flow control variable restrictor means 60 and the control device 12 while the control device 17 is disposed intermediate the variable flow 61 and the control device 12.

The flow control variable restrictor means 60 is so constructed and arranged that the same will maintain a constant fluid flow rate into the conduit 50 that leads to the chamber 26 of the control device 12 regardless of the variation in the pressure in the chamber or conduit 50 as being provided by the variable vent means 16 or regardless of variations in the pressure at the source 11. Similarly, the flow control variable restrictor means 61 will maintain a constant fluid flow rate into the conduit 59 leading to the control device 12 regardless of the change of pressure in the conduit 59 by the change of the venting means 17 during different temperature sensing conditions thereof and regardless of variations in the pressure of the pneumatic source 11.

In particular, the flow control variable restrictor means 60 and 61 each comprises a resilient washer-like member 62, as illustrated in FIGS. 2, 3 and 4, which is adapted to be disposed in the pneumatic flow control lines, the flow control device 62 having opposed flat sides 63 and 64 provided with an opening 65 passing centrally therethrough with the opening 65 joining the side 63 thereof with an arcuate edge means 66 as illustrated in FIGS. 2–4. The fluid flow through the flow control device 62 is from left to right in FIGS. 2–4 with the higher pressure being on the side 63 thereof and when the pressure differential acting across the device 62 is relatively narrow, the opening 65 through the flow control device 62 assumes the position illustrated in FIG. 3 wherein the opening 65 provides the least restriction to fluid flow therethrough. However, as the pressure differential acting across the flow control device 62 increases, the side 63 tends to move toward the side 64 thereof whereby the opening 65 through the flow control device 62 begins to reduce in size as illustrated in FIG. 4 so that the flow rate therethrough remains the same even though a higher pressure differential is acting across the flow control device 62.

In this manner, when viewing FIG. 1, should the pressure in the conduit means 59 decrease because of the ball valve member 56 venting the conduit 59 to the atmosphere at a greater rate, a resulting increase in the pressure differential exists across the flow control device 61 whereby the opening through the flow control device 61 decreases to compensate for the drop in pressure in the conduit 59 so that the flow rate therein remains the same as the device 61 distorts. Conversely, should the pressure in the conduit 59 begin to build up by the ball valve member 56 decreasing the degree of interconnection of the conduit 59 at the atmosphere, the resulting pressure differential now acting across the flow control device 61 decreases so that the same begins to assume more of the shape illustrated in FIG. 3 whereby the flow rate into the conduit means 59 remains substantially the same.

Therefore, it can be seen that although the pressure in the conduit means 59 and 50 leading to the comparator 12 are varying in view of the variable vent devices 17 and 16 for the reasons previously set forth, the fluid flow rates in the conduit means 59 and 50 remain substantially constant because of the action of the flow control variable restrictor means 61 and 60 for the reasons previously set forth whereby the air consumption of the control system 10 is greatly reduced when compared to a like system having the restriction means 60 and 61 fixed restrictors.

Thus, it can be seen that the control system 10 of this invention provides means for maintaining a constant air flow to the control device 12 although the supply pressure and/or signal pressure may vary whereby the control device 12 is more responsive and operates on less air consumption at varying supply and signal pressures than when no variable flow restriction means 60 and 61 of this invention are utilized.

Accordingly, the control system 10 includes a pressure chamber 50 or 59 having an inlet 39 or 40 for receiving a fluid supply flow 11 and an outlet 14 or 15 for supplying a control fluid output to a control device 12. The pressure chamber 50 or 59 also includes valve regulator means 16 or 17. The inlet 39 or 40 to the pressure chamber 50 or 59 is through a resilient restrictor 60 or 61 which responds to pressure on opposite sides thereof to vary the size of the orifice 65 therethrough. When the valve regulator or vent means 16 or 17 closes and causes a decrease in pressure drop across the restrictor 60 or 61 creating a corresponding build-up in pressure in the pressure chamber 50 or 59, the backpressure on the restrictor 60 or 61 increases the diameter of the orifice 65 as illustrated in FIG. 3 to allow a greater air flow into the pressure chamber 60 or 59 through the restrictor 60 or 61. Conversely, when the vent means 16 or 17 increases its opening to the atmosphere, there is an increase in the pressure drop across the restrictor 61 or 60 because of a corresponding decrease in the pressure in the chamber 50 or 59 which results in an extrusion of the restrictor 60 or 61 in the manner illustrated in FIG. 4 which decreases the diameter of the orifice 65 and reduces the air flow to the chamber 50 and 59. Thus, it can be seen that the air flow in the passage means 50 and 59 remains constant regardless of variations in pressure within the chamber 50 and 59 and regardless of variation in the supply pressure 11 within certain limits.

Another control system of this invention is generally indicated by the reference numeral 70 in FIG. 5 and parts thereof similar to the control system 10 are indicated by like reference numerals followed by the reference numeral "A".

As illustrated in FIG. 5, the control system 70 includes a temperature responsive device 17A formed in the same manner as the previously described temperature sensing device 17 for venting a conduit means 71 to the atmosphere, the conduit means 71 being interconnected to a branch conduit means 72 having its left-hand end 73 adapted to be interconnected to a control device 74. A pneumatic source conduit 75 is provided and is adapted to supply the conduit 71 with fluid pressure through a flow control variable restrictor means 76 of this invention which functions in the same manner and for the same purpose as the restrictor means 60 and 61 previously described.

The flow control means 76 comprises a housing means 77 divided into two chambers 78 and 79 by a flexible diaphragm 80 carrying a needle valve member 81 having its needle point 82 movable relative to a valve seat 83 defined by the housing 77 and being interconnected on its output side 84 to the conduit 72 and on its input side 85 to a passage means 86 in the housing 77 that leads to a fixed restrictor 87 interconnected to the pressure source conduit 75. The housing 77 has an opening 88 therein which interconnects the passage 86 thereof with the chamber 79 and the housing 77 has an inlet 89 to the chamber 78 that is interconnected to the pressure source conduit 75 by a branch conduit 90. The needle valve member 81 is normally urged to its fully opened position by a compression spring 91 disposed in the chamber 79 between the diaphragm 80 and the housing 77.

The operation of the flow control means 76 in combination with the variable vent means 17A for maintaining a constant air flow in the conduit 71 to the control device 74 will now be described.

Should the pressure in the conduit 71 decrease because of the vent means 17A increasing the fluid interconnection of the conduit 71 with the atmosphere, a corresponding decrease occurs in the chamber 79 which opposes the pressure in the chamber 78 whereby the resulting pressure differential across the diaphragm 80 in opposition to the force of the compression spring 91 moves the needle valve 81 downwardly to decrease the size of the orifice produced by the needle end 82 with the valve seat 83 whereby the flow rate into the conduit 71 remains the same or remains substantially constant in the same manner that the previously described flow control device 64 reduces its orifice size upon a resulting increase in the pressure differential acting across the same.

Conversely, an increase in the pressure in the conduit means 71 by the vent means 17A decreasing the amount of fluid interconnection of the conduit 71 with the atmosphere causes the needle valve member 81 to move upwardly to increase the size of the orifice produced by the needle end 82 thereof with the valve seat 83. In particular, a build-up in pressure in the chamber 79 because of a build-up of pressure in the conduit 71 causes the pressure differential across the diaphragm 80 to decrease so that the compression spring 91 can move the diaphragm 80 upwardly and, thus, move the needle valve member 81 upwardly relative to the valve seat 83 to increase the size of the orifice at the needle end 82 in much the same manner that the flow control device 62 increases its orifice size when the pressure differential acting across the same decreases.

Therefore, it can be seen that the control system 70 also maintains a constant flow rate in the pressure chamber or conduit means 71 that leads to the control device 74 in substantially the same manner as the control system 10 previously described.

While the form of the invention now preferred has been disclosed as required by the patent statutes, other forms may be utilized all coming within the scope of the claims which follow.

What is claimed is:

1. A method for controlling a pneumatically operated control device comprising the steps of interconnecting a source of pneumatic fluid to said control device with a passage defining means, disposing a resilient washer-like member in said passage means so that the fluid flow from said source to said control device must pass through the opening through said washer-like member whereby said washer-like member comprises a flow control variable restrictor means, controlling the fluid flow in said passage defining means with said flow control variable restrictor means that is disposed in said passage defining means intermediate said source and said control device whereby said passage defining means has a part thereof between said restriction means and said control device, venting said part of said passage means with a variable vent means interconnected to said part of said passage defining means and being responsive to pressure in said part of said passage defining means, and varying said restrictor means to tend to maintain a substantially constant pneumatic flow in said part of said passage defining means even though the pressure in said part of said passage defining means is varying, said step of varying said restrictor means comprising the steps of reducing the size of the opening through said washer-like member upon an increase in the pressure differential across said resilient washer-like member by having the increased differential across said washer-like member centrally bow said washer-like member and increasing the size of the opening therethrough upon a decrease in the pressure differential across said resilient washer-like member by having the decreased differential across said washer-like member cause unbowing of said washer-like member.

2. A method as set forth in claim 1 and including the step of also varying said restrictor means to tend to maintain a substantially constant pneumatic flow in said part of said passage defining means even though the pressure of said source varies.

3. A method as set forth in claim 1 wherein said step of venting said part of said passage defining means with a variable vent means comprises the step of interconnecting a valve seat to said part of said passage defining means, disposing a valve member relative to said valve seat for controlling the same, and operatively interconnecting spring means to said valve member to urge said valve member in one direction relative to said valve seat while the pressure in said part of said passage defining means acts on said valve member to urge said valve member in the opposite direction relative to said valve seat.

4. A method as set forth in claim 3 wherein said step of disposing said valve member relative to said valve seat comprises the step of disposing a ball valve member relative to said valve seat.

5. A method as set forth in claim 3 wherein said step of disposing said valve member relative to said valve seat comprises the step of disposing a flexible diaphragm valve member relative to said valve seat.

6. A method as set forth in claim 3 wherein said step of disposing said valve member relative to said valve seat comprises the step of disposing a needle-like valve member relative to said valve seat.

7. A method as set forth in claim 3 and including the step of adjusting said spring means to vary the force thereof acting on said valve member.

8. A method as set forth in claim 7 wherein said step of adjusting said spring means comprises the step of manually adjusting the force of said spring means.

9. A method as set forth in claim 7 wherein said step of adjusting said spring means comprises the step of adjusting said spring means in response to a sensed condition.

* * * * *